(12) United States Patent
Ju et al.

(10) Patent No.: US 6,839,895 B1
(45) Date of Patent: *Jan. 4, 2005

(54) METHOD OF, SYSTEM FOR, AND COMPUTER PROGRAM PRODUCT FOR PROVIDING EFFICIENT UTILIZATION OF MEMORY HIERARCHY THROUGH CODE RESTRUCTURING

(75) Inventors: Dz Ching Ju, Sunnyvale, CA (US); Kalyan Muthukumar, Cupertino, CA (US); Shankar Ramaswamy, Bethel Park, PA (US); Barbara Bluestein Simons, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 822 days.

This patent is subject to a terminal disclaimer.

(21) Appl. No.: 09/685,481

(22) Filed: Oct. 10, 2000

Related U.S. Application Data

(63) Continuation of application No. 08/987,911, filed on Dec. 9, 1997.

(51) Int. Cl.$^7$ .................................................. G06F 9/45
(52) U.S. Cl. ........................ 717/159; 717/144; 717/156; 717/160
(58) Field of Search ................................. 717/136–137, 717/140–161; 711/153, 117–129, 170–173, 207–208

(56) References Cited

U.S. PATENT DOCUMENTS

| | | |
|---|---|---|
| 5,418,958 A | 5/1995 | Goebel |
| 5,428,793 A | 6/1995 | Odnert et al. |
| 5,748,844 A | 5/1998 | Marks |
| 5,797,012 A | 8/1998 | Blainey et al. |
| 5,828,961 A | 10/1998 | Subramamian et al. |
| 5,933,644 A | 8/1999 | Wallace |
| 5,950,009 A | 9/1999 | Bortnikov et al. |
| 5,999,737 A | 12/1999 | Srivastava |
| 6,064,819 A | 5/2000 | Franssen et al. |
| 6,175,957 B1 * | 1/2001 | Ju et al. ................... 717/156 |

FOREIGN PATENT DOCUMENTS

EP          881568 A2 * 12/1998   ........... G06F/09/46

OTHER PUBLICATIONS

Tomko et al, "Profile Driven Weight Decomposition", ACM, pp. 165–172, 1996.*

Simons B., "Code Positioning for Procedures and Basic Blocks", IBM Technical Report ADTI–1994,–006; also available as IBM Santa Teresa Laboratory Technical Report TR 03.580.

Heisch R.R., Trace–Directed Program Restructuring for AIX Executables:, *IBM Journal of Research and Development*, vol. 38, pp. 595–603, Sep. 1994.

(List continued on next page.)

*Primary Examiner*—Antony Nguyen-Ba
*Assistant Examiner*—Ted T. Vo
(74) *Attorney, Agent, or Firm*—Gates & Cooper LLP

(57) ABSTRACT

Code restructuring or reordering based on profiling information and memory hierarchy is provided by constructing a Program Execution Graph (PEG) corresponding to a level of the memory hierarchy, partitioning this PEG to reduce estimated memory overhead costs below an upper bound, and constructing a PEG for a next level of the memory hierarchy from the partitioned PEG. The PEG is constructed from control flow and frequency information from a profile of the program to be restructured. The PEG is a weighted undirected graph comprising nodes representing basic blocks and edges representing transfer of control between pairs of basic blocks. The weight of a node is the size of the basic block it represents and the weight of an edge is the frequency of transition between the pair of basic blocs it connects.

18 Claims, 8 Drawing Sheets

OTHER PUBLICATIONS

Pettis K. et al., "Profile Guided Code Positioning", *Proceedings of the ACM Sigplan '90 Conference on Programming Language Design and Implementation (PLDI)*, pp. 16–127, Jun. 1990.

Garey M.R. et al., *Computers and Intractability: A Guide to the Theory of NP–Completeness*, 124–127, W.H. Freeman & Co., San Francisco, CA, 1979.

Barnard S.T. et al., "Fast Multilevel Implementation of Recursive Spectral Bisection for Partioning Unstructured Problems", *Concurrency: Practice and Experience*, vol. 6(2), pp. 101–117, Apr. 1994.

Srivastava A. et al., "A Practical System for Intermodule Code Optimization at Link–Time", *Journal of Programming Languages*, vol. 1, pp. 1–18, 1993.

* cited by examiner $G_2$ n2 = 512 bytes (not realistic)

$G_2$ $n_2$ = 512 bytes (not realistic)

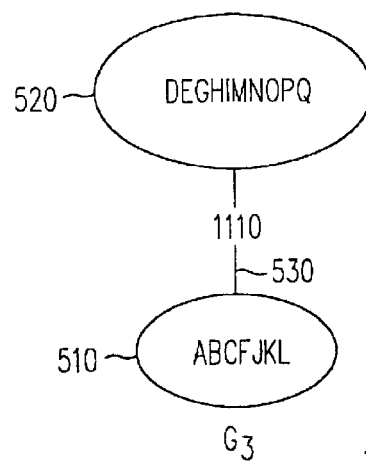
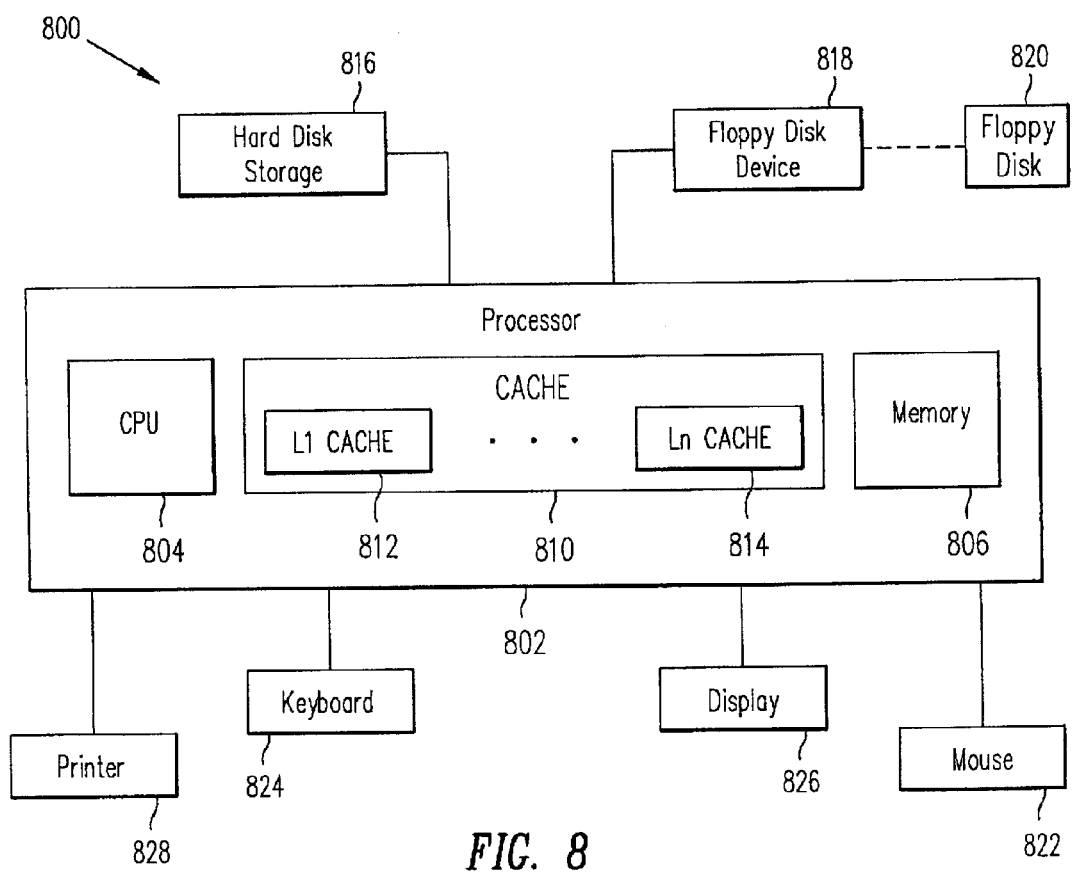

METHOD OF, SYSTEM FOR, AND COMPUTER PROGRAM PRODUCT FOR PROVIDING EFFICIENT UTILIZATION OF MEMORY HIERARCHY THROUGH CODE RESTRUCTURING

CROSS REFERENCES TO RELATED APPLICATIONS

This application is a Continuation of application Ser. No. 08/987,911, filed Dec. 9, 1997, entitled "METHOD OF, SYSTEM FOR, AND COMPUTER PROGRAM PRODUCT FOR PROVIDING EFFICIENT UTILIZATION OF MEMORY HIERARCHY THROUGH CODE RESTRUCTURING", which application is incorporated herein by reference."

STATEMENT AS TO RIGHTS TO INVENTIONS MADE UNDER FEDERALLY SPONSORED RESEARCH AND DEVELOPMENT

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to optimizing compilers for development of computer programs for use on a computer, and more particularly to code restructuring.

2. Description of the Related Art

Advances in processor designs have provided very high speed instruction processing. In order to sustain this speed, processors need very effective usage of the memory hierarchy of the machines. Ensuring effective usage is difficult for large programs like compilers or database engine codes that have complex control flow. This occurs, for example, as a result of having to consider inputs of different types or handle error conditions appropriately. Consequently, code generated for large complex programs consists of sections that are heavily executed intermingled with sections that are infrequently executed, resulting in poor utilization of the memory hierarchy. Code restructuring may improve memory hierarchy utilization and, consequently, performance.

The state of the art of code restructuring techniques is described in Simons (B. Simons, "Code Positioning for Procedures and Basic Blocks," IBM Technical Report ADTI-1994-006; also available as IBM Santa Teresa Laboratory Technical Report TR 03.580.). Two representative techniques described by Simons include the IBM Heatshrink and the IBM AOPT products. Heatshrink, a trace-directed program restructuring (TDPR) tool, was designed and implemented by Randy R Heisch. A more detailed description of Heatshrink is given in Heisch (R. R. Heisch, "Trace-Directed Program Restructuring for AIX Executables", *IBM Journal of Research and Development,* vol. 38, September 1994.). AOPT, a stand-alone tool developed by Itai Nahshon, attempts to locate a "hot path" in the code and then move the entire path as a single entity, rather than move individual basic blocks. Profile information, used by both Heatshrink and AOPT, is obtained by AOPT. Profiling involves running code using sample or representative inputs. Based on the behavior of the code on the given inputs, one makes assumption about its behavior on all inputs. Heatshrink and AOPT both perform global reordering of basic blocks and are bundled together as part of FDPR (Feedback Directed Program Restructuring tool), an IBM Licensed Program Product for IBM AIX Operating System, Version 4.1.

Pettis et al. (K. Pettis and R. C. Hansen, "Profile Guided Code Positioning," *Proceedings of the ACM SIGPLAN '90 Conference on Programming Language Design and Implementation (PLDI),* pp. 16–27, June 1990.) follow a different approach, that also relies on profiling information, but that moves executed basic blocks only within a procedure in addition to moving procedures. Basic blocks that are not executed according to the profile data are moved to a separate region at the end of an ordering.

These and other conventional techniques for code restructuring attempt to keep frequently executed code close together in memory. Intuitively, such an approach tries to retain the working set of frequently executed code in cache. If the working set fits in the cache, this approach is reasonable, on the other hand, if the cache is small or if the effective portion of the cache available to an application is small due to multiprogramming, conventional code restructuring techniques may not perform well. A major flaw of these conventional approaches is that "closeness" in memory does not actually relate to cache or paging performance. Two basic blocks may be "close" together in memory, and yet there may still be a cache miss or page fault transitioning between the two basic blocks, or they may be very far apart and still cause the same effect of a cache miss or page fault. Thus, conventional code restructuring techniques fail to realize that blocks interacting frequently should be kept in the same cache line or page rather than "close" to each other in memory. Conventional code restructuring techniques also fail to realize that memory hierarchy hardware parameters such as cache line size, page size, cache associatively size and translation lookaside buffer (TLB) size may be considered in determining the code structure of an application.

Thus, the conventional code restructuring techniques fail to consider memory hierarchy. As such, there is a need for a method of, system for, and computer program product for, providing code restructuring dependent upon a memory hierarchy.

SUMMARY OF THE INVENTION

The invention disclosed herein comprises a method of a system for, and an article of manufacture for providing code restructuring based on profiling information and memory hierarchy, that is also scalable to arbitrary levels of memory hierarchy.

The present invention reorders code to reduce communications across cache line and across page boundaries. The present invention also reorders code to reduce the likelihood that chunks of code that communicate with each other and that have the same cache or TLB associativity set will be assigned to different cache lines or pages. The present invention may be generalized to deal with multiple levels of cache or other types of memory hierarchy.

The present invention accomplishes this by reordering code such that chunks of code that communicate extensively with each other are on the same cache line, page, or other level of memory hierarchy. Reordering is performed by first clustering the nodes, performing first level padding of unfilled clusters with basic blocks that were not accessed in profiling, and then performing additional padding using no-operation instructions (NOP or NO-OP) to fill out any unfilled portion of that level of the memory hierarchy. For example, to reorder code for a first level cache line, nodes are clustered to reduce communications across cache lines, any of these clusters which are unfilled clusters are padded with basic blocks that were not accessed in profiling, and then any unfilled cache lines are further padded with NOPs to fill out the cache lines.

The present invention avoids set collisions by considering both memory hierarchy size and associativity. Associativity means that there is a connection between a memory location and the place in the memory hierarchy to which the data for that memory location is assigned. 4-way associativity, for example, means that the cache is divided into four sets, and each memory location is uniquely mapped into one of those four sets. This mapping may be done by using two bits of the memory location address. If a cache line is 128 bytes in size, and if a memory word contains 4 bytes, then 32 words will fit on one cache line. A primary objective of the associativity mapping is to have each consecutive chunk of 32 words map to different associativity sets. If bits 6 and 7 of the memory location address are used to determine to which associativity set a 32 bit chunk maps, then adjacent 32 word chunks map to different sets. A set collision occurs when all the cache lines in a particular set are full. This may occur even if one of the other sets has space. As conventional processor implementations hard wire the associativity between memory and cache sets, data may not arbitrarily occupy a cache line in an associativity set that differs from the one to which the particular memory is assigned. The present invention considers both memory hierarchy size and associativity to avoid such associativity set collisions by dividing the cache size by its associativity, i.e., if an 8K cache is 4-way set associative, then n2=2048 bytes. This n2 falls between the cache line size, n1, of 128 bytes and the page size, n3, of 4096 bytes. Similarly, the TLB size divided by its associativity is considered. Alternative embodiments of the present invention may be modified to ignore various levels of the memory hierarchy; for example, an alternative embodiment may ignore associativity.

The present invention restructures code by constructing a Program Execution Graph (PEG) corresponding to a level of the memory hierarchy, partitioning this PEG to reduce estimated memory overhead costs, and constructing a PEG for a next level of the memory hierarchy from the partitioned PEG. The present invention may be performed by:

a. constructing a Program Execution Graph (PEG) from control flow and frequency information from a profile of the program to be restructured. The profile of the program is produced by running the program using sample or representative inputs. The present invention assumes that the profiled program behavior is representative of the general program behavior, i.e., that basic blocks that communicate in the profiling will communicate in general. This type of profiling assumption is commonly used in practice by those skilled in the art. The PEG is a weighted undirected graph comprising nodes representing basic blocks and edges representing transfer of control between pairs of basic blocks. The weight of a node is the number of bytes in the basic block it represents, and the weight of an edge is the frequency of transition in the profiling between the pair of basic blocks it connects. Those skilled in the art recognize that the unit of measurement for the weight may be a unit other than bytes, i.e., bits, words, etc.

b. partitioning or clustering the nodes of the PEG into clusters such that the sum of the weights of the nodes in any cluster is no greater than an upper bound, and the sum of the weights of the edges between the clusters is minimized.

c. constructing a next PEG from the clusters of the partitioned PEG such that a node in the next PEG corresponds to a duster in the partitioned PEG, and such that there is an edge between two nodes in the next PEG if there is an edge between the clusters represented by the two nodes.

d. assigning weights to the nodes and edges of the next PEG to produce a PEG.

e. repeating steps b through e for each level of the memory hierarchy.

f. restructuring the basic blocks corresponding to the clusters into contiguous code starting at an appropriate memory boundary, and adding NOPs as needed so that the number of memory locations occupied by each duster is equal to an upper bound of the cluster weight.

In accordance with one aspect of this invention, a Program Execution Graph constructor constructs a Program Execution Graph (PEG), a weighted undirected graph comprising nodes representing basic blocks or clusters of basic blocks and edges representing transfer of control between pairs of basic blocks where each basic block in the pair is in a different cluster, wherein a weight of a node of the PEG is a size of a represented basic block, and a weight of an edge is a frequency of transition between a pair of basic blocks that the edge connects or a frequency of transition between elements of two clusters that the edge connects.

In accordance with another aspect of this invention, the PEG, a weighted undirected graph $G=(V,E)$ with edge and node weights, is partitioned into clusters such that the sum of the weights of the edges whose endpoints are in different partitions is minimized and the sum of weights of nodes in each set is no greater than a given upper bound.

In accordance with another aspect of this invention, a PEG for level i of a memory hierarchy, $G_i=(V_{i\,2}, E_i)$, is partitioned into clusters, and these clusters from level i are the nodes for $G_{i+1}=, (V_{i+1}, E_{i+1}$, a PEG for level i+1 of the memory hierarchy.

In accordance with another aspect of this invention, if u and $v \in V_{i+1}$, there is edge (u,v) between u and v if and only if there is an edge between some pair of nodes in $G_i$, one of which is in the cluster corresponding to u and one of which is in cluster corresponding to v.

In accordance with another aspect of this invention, the weight of edge (u,v) in $G_{i+1}$ is the sum of the weights of the edges between component nodes of u and v in $G_i$.

In accordance with another aspect of this invention, the upper bound for a level of the memory hierarchy may be equal to the size of that level of the memory hierarchy.

In accordance with another aspect of this invention, the upper bound for a level of the memory hierarchy may be equal to a multiple of the size of that level of the memory hierarchy.

The present invention has the advantage of restructuring code responsive to a memory hierarchy.

The present invention has the further advantage of reducing memory hierarchy access cost of restructured code.

The present invention has the further advantage of reducing cache misses between basic blocks of restructured code.

The present invention has the further advantage of reducing page faults between basic blocks of restructured code.

The present invention has the further advantage of restructuring code responsive to multiple levels of cache or other types of memory hierarchy.

The present invention has the further advantage of being extendable to deal with additional memory hierarchies, such as second level (L2) or higher caches that may be introduced in future machines.

BRIEF DESCRIPTION OF THE DRAWINGS

For a more complete understanding of the present invention and the advantages thereof, reference is now made to the Detailed Description in conjunction with the attached Drawings, in which:

FIG. 5 shows a Program Execution Graph $G_3$ of a third memory hierarchy level produced from the clusters of the partitioned Program Execution Graph $G_2$ in accordance with the present invention;

FIG. 8 shows a computer system used in performing the method of the present invention, forming part of the apparatus of the present invention, and which may use the article of manufacture comprising a computer-readable storage medium having a computer program embodied in said medium which causes the computer system to practice the present invention.

DESCRIPTION OF THE PREFERRED EMBODIMENTS

Figure 1:
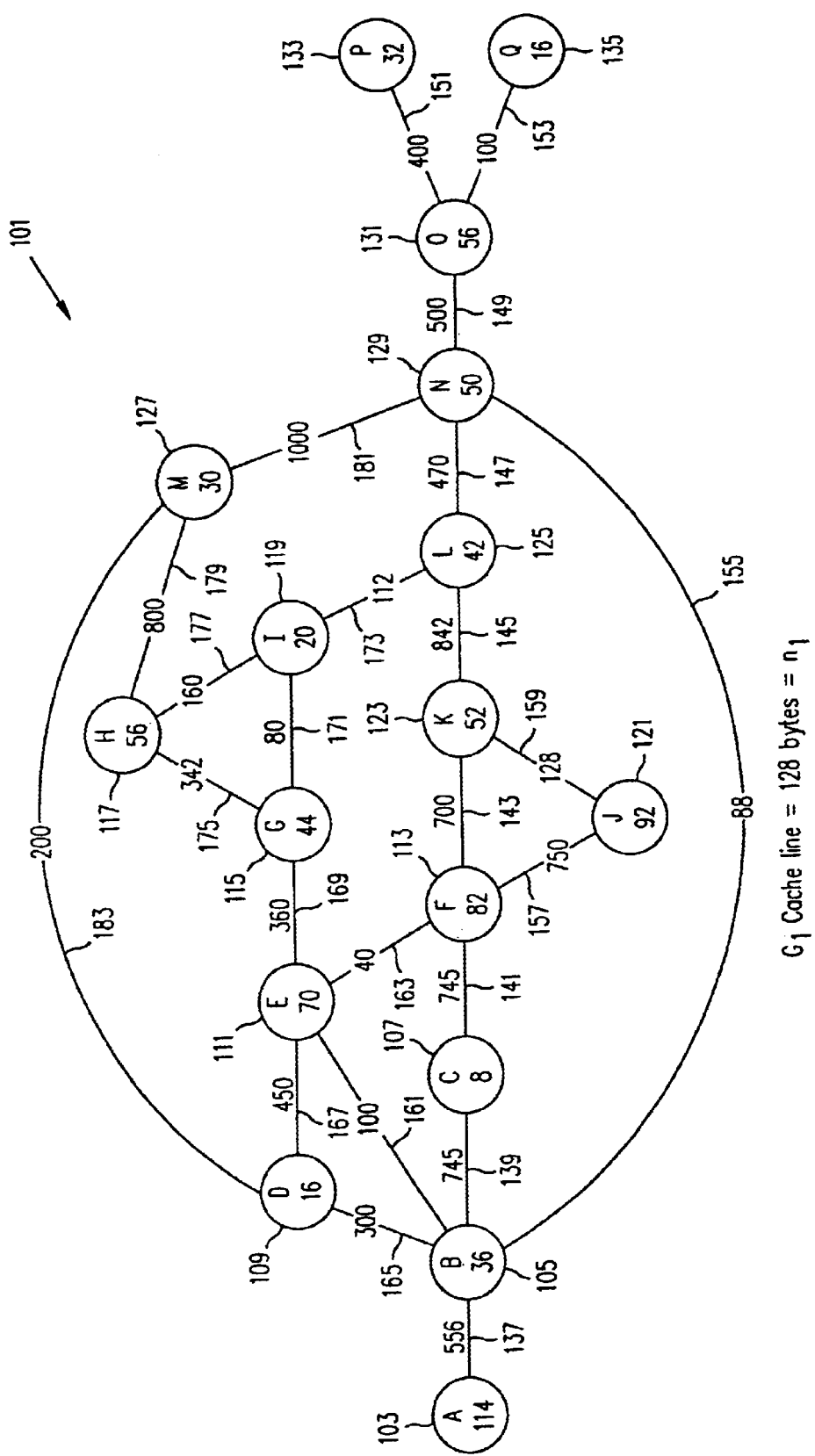
FIG. 1 shows a Program Execution Graph $G_1$ of a first memory hierarchy level.

Referring now to FIG. 1 through FIG. 5, sample Program Execution Graphs are shown to illustrate the practice of the present invention. The control flow and frequency information of the profiled program is organized in the form of a Program Execution Graph (PEG) which is a weighted undirected graph. For example, FIG. 1 illustrates a PEG $G_1$, generally referred to as 101, where $G_i = (V_1, E_1)$. A node in the set of nodes $V_1$ corresponds to a basic block that has been executed at least once during profiling. For $G_1$ 101, the set of nodes $V_1$ comprises the set {A 103, B 105, C 107, D 109, E 111, F 113, G 115, H 117, I 119, J 121, K 123, L 125, M 127, N 129, O 131, P 133, and Q 1135}. An edge (u, v), in the set of edges $E_1$, between nodes u and v implies that there is some transition that occurs during profiling between the two basic blocks represented by u and v. For $G_1$ 100, the set of nodes $E_1$ comprises the set {(A, B) 137, (B, C) 139, (C, F) 141, (F, K) 143, (K, L) 145, (L, N) 147, (N, O) 149, (O, P) 151, (O, Q) 153, (B, N) 155, (F, J) 157, (J, K) 159, (B, E) 161, (E, F) 163, (B, D) 165, (D, E) 167, (E, G) 169, (G, I) 171, (I, L) 173, (G, H) 175, (H, I) 177, (H, M) 179, (M, N) 181, and (D, M) 183}. The weight of a node v, written $W_1(v)$, is the size (in bytes) of the basic block that v represents. In $G_1$ 101, node A 103 has a weight $W_1(A)$ of 114 bytes, node B 105 has a weight $W_1(B)$ of 36 bytes, C 107 has a weight $W_1(C)$ of 8 bytes, and so on. The weight of edge e=(u,v), written $W_1(e)$, is the total number of transitions from basic block u to basic block v plus the total number of transitions from basic block v to basic block u. In $G_1$ 101, edge (A, B) 137 has a weight $W_1((A, B))$ of 556 transitions, edge (B,C) 139 has a weight $W_1((B,C))$ of 745 transitions, edge (C, F) 141 has a weight $W_1((C, F))$ of 745 transitions, and so on.

Using the initial PEG $G_i$ for a program and given all the parameters for a n-level memory hierarchy, the present invention performs code restructuring in n or fewer steps. The $i^{th}$ step constructs a new PEG $G_{i+1}$, by clustering PEG $G_i$, wherein graph partitioning is performed on $G_i$ to produce the clustering. Clustering and graph partitioning are discussed in the following paragraphs.

A cluster, written Cl, is defined to be a set of nodes. A clustering of a graph G with upper bound N, written Clust (G,N), is a partitioning of the nodes in G into clusters so that the sum of the node weights of the nodes in any cluster is no greater than N. Each cluster in a partitioned PEG represents a unit in the level of the hierarchy for which clustering is performed. For example, in the first stage, a unit represents the size of a cache line (in bytes) or some integral multiple of this size (to allow for basic blocks that are larger than a cache line).

The goal of a graph partitioning heuristic is to create clusters of nodes from the PEG such that the sum of the weights of the edges that have endpoints in different clusters is minimized, subject to the total weight of the nodes in each cluster not exceeding N. This goal is modeled by using a cost function C( ). For edge e, e has zero cost in Clust(G,N), written C(e)=0, if both endpoints of e are in the same cluster for Clust(G,N). Otherwise, e has a cost in Clust(G,N), C(e)=1. Those skilled in the art recognize that costs other than zero or one may be assigned by the cost function for the purposes of partitioning the graph. The goal is to compute a clustering that minimizes the sum of C(e) times W(e) for all edges e in E. The result of graph partitioning is to create the clusters, i.e., to assign values to C(e) for all edges e in E. If C(e)=0, then the endpoints of edge e are in the same cluster; otherwise, the endpoints of edge e are in different clusters.

Each cluster represents a unit in the stage of the hierarchy for which clustering is performed. Because a basic block may be larger than a cache line, the first stage of the heuristic allows a cluster to be the size of some multiple of the number of bytes in a cache line. At each subsequent stage, the clusters are limited to the size of the portion of the memory hierarchy being considered, for example, a memory page size. However, if for some reason this cluster size is not preferred, the heuristic may be easily modified to assign a different value to the cluster size.

The cost function is an approximation of the memory hierarchy overhead incurred by the restructured program on a real machine. Formally, the code restructuring problem may be defined as a first minimization of $\Phi_1$, then a minimization of $\Phi_2$, then a minimization of $\Phi_3$, ... and a final minimization of $\Phi_k$, where k is the number levels in the memory hierarchy, and where:

$$\Phi_i = \sum_{e \in E_i} C(e) \times W(e)$$

The objective is to construct a clustering Clust($G_i, N_i$) so that $\Phi_1$ is the summation of the product of C(e) and W(e) for all e in $E_i$; where C(e)=0 if both endpoints of e are in the same cluster and C(e)=1 otherwise; where the sum of the node weights of the nodes in each cluster in Clust($G_i, N_i$) is no greater than $N_i$, and where $N_i$ is some multiple of the cache line size.

For example, if a cache line size is 128 bytes, $N_1$ may be set to 128 bytes, and $G_1$ may be partitioned into clusters such that the sum of the node weights of the nodes in each cluster is no greater than 128 bytes where $N_1$ is a multiple of one times the cache line size. Such a partitioning of $G_1$ yields a clustering Clust($G_1$, $N_1$)={{A 101 }{B 105, C 107, F 113}, {J 121}, {K 123, L 125}, {D 109, E 111}, {G 115, H 117,I 119}, {M 127, N 129}, {O 131, P 133, Q 135}}. Clustering Clust($G_1$, $N_1$) is illustrated in FIG. 2 where duster 205 comprising {A 103} has a node weight sum of 114 bytes; cluster 210 comprising {B 105, C 107, F 113} has a node weight sum of 126 bytes; cluster 215 comprising {J 121} has a node weight sum of 92 bytes; duster 220 comprising {K 123, L 125} has a node weight sum of 94 bytes; cluster 225 comprising {D 109, E 111} has a node weight sum of 86 bytes; cluster 230 comprising {G 115, H 117,I 119} has a node weight sum of 120 bytes, duster 235 comprising {M 127, N 129} has a node weight sum of 80 bytes; and cluster 240 comprising {O 131, P 133, Q 135} has a node weight sum of 104 bytes.

Once a clustering on $G_1$ is constructed, "padding" is performed by adding basic blocks that were not executed during the profiling to dusters that have capacity, i.e. where the sum of the weights of the nodes in the cluster is less than $N_1$ and where adding the un-executed basic block will not cause the sum of the cluster's weights to exceed $N_1$. If there are still basic blocks remaining that have not been added to any of the clusters, and if there is no more cluster capacity to absorb these basic blocks, then they are grouped into additional clusters of their own. The technique of adding the unexecuted basic block nodes to the clusters or of putting them into their own clusters is called bin packing. A greedy bin packing heuristic may be used for performing the bin backing.

Figure 2:
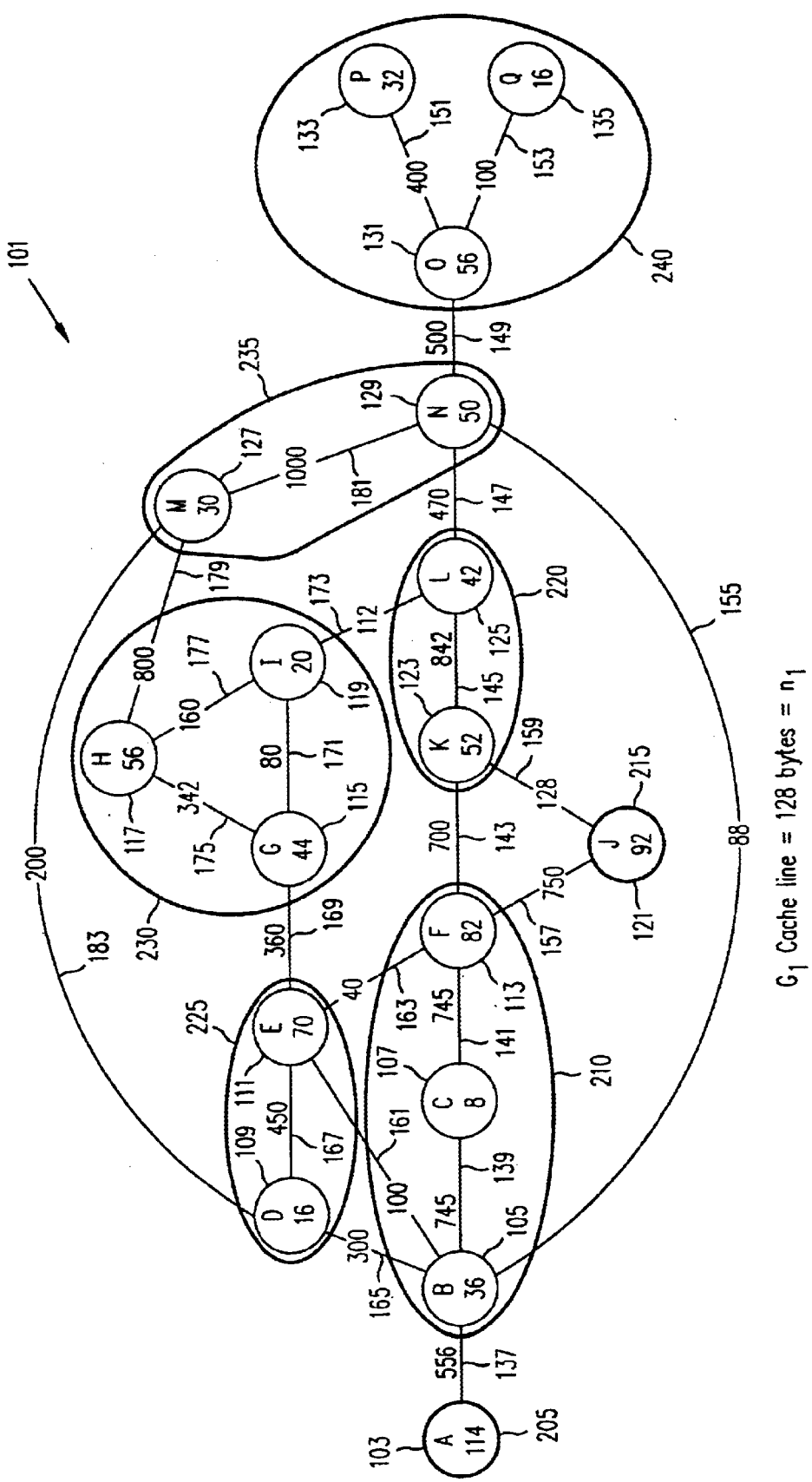
FIG. 2 shows a partitioned Program Execution Graph $G_1$ produced in accordance with the present invention.

Although the example of FIG. 2 does not contain any un-executed basic blocks that may be used for padding (as the initial PEG does not include un-executed basic blocks in its node set), if there is an additional unexecuted basic block whose size is less than 48 bytes, it may be padded into the cluster 235 with node M 127 and node N 129 yielding a padded cluster whose sum of node weights does not exceed $N_1$=128. In a similar manner, a greedy bin packing heuristic may pad the other clusters.

Once all of the basic blocks have been put into some cluster, then the next stage is performed which is the construction of a graph $G_2=V_2$, $E_3$). Each node in $V_2$ corresponds to a cluster in $G_1$, and each node in $V_2$ has a weight of one. This weight corresponds to the assignment of $N_1$ bytes to the basic blocks in each cluster. An edge e=(u,v) exists in $E_2$ if and only if both u and v are in $V_2$, u and v correspond to different clusters, and there is some edge in $E_1$ from one of the nodes in the cluster represented by it to some node in the duster represented by v, or visa versa. The weight of e is the sum of the weights of all edges in $E_1$ that have endpoints in the two clusters (u and v).

Figure 3:
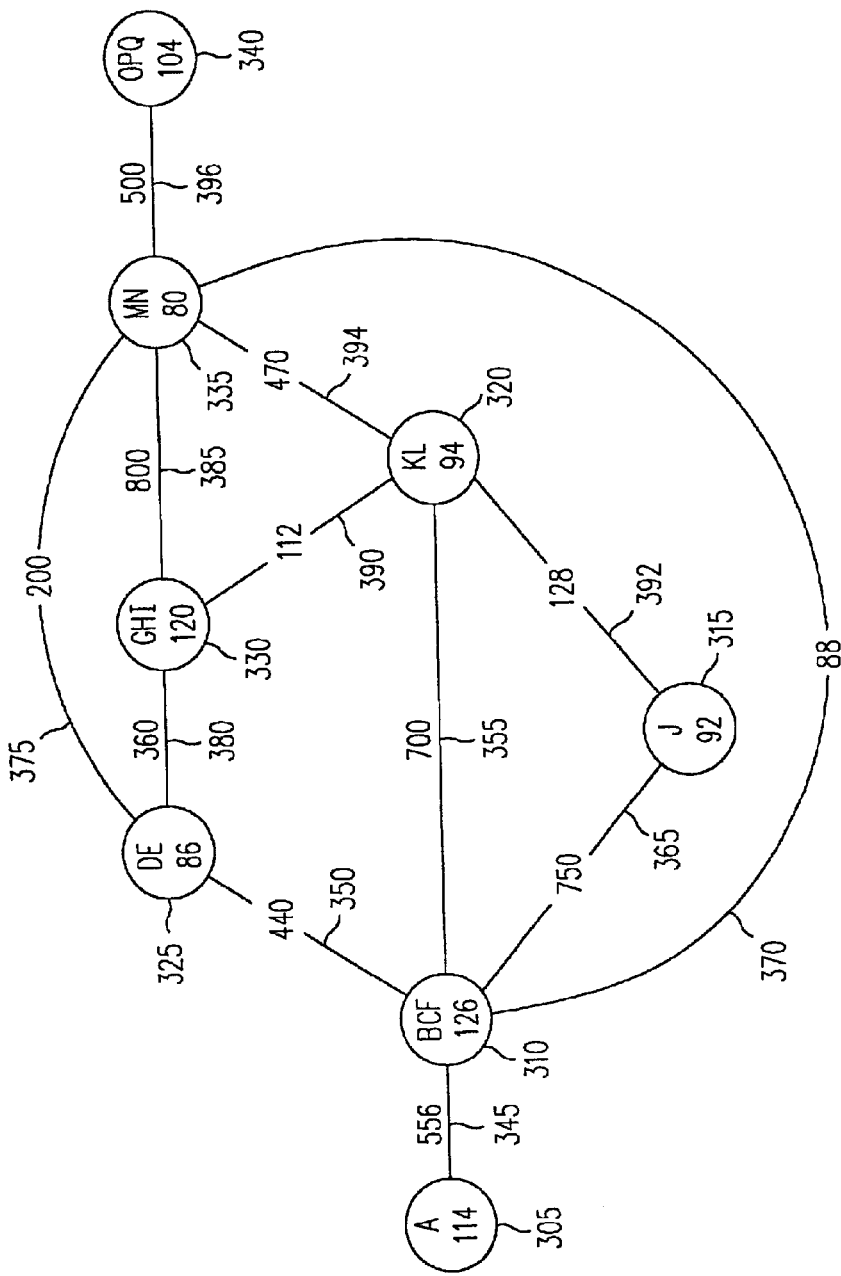
FIG. 3 shows a Program Execution Graph $G_2$ of a second memory hierarchy level produced from the dusters of the partitioned Program Execution Graph $G_1$ in accordance with the present invention.

Referring next to FIG. 3, a graph $G_2$=(E) constructed from the clusters Clust($G_1$, $N_1$) of $G_1$ is illustrated. $G_2$ is constructed by creating a node corresponding to each cluster of Clust($G_1$, $N_1$) such that node A 305 corresponds to cluster 205, node BCF 310 corresponds to cluster 210, node J 315 corresponds to duster 215, node KL 320 corresponds to cluster 220, node DE 325 corresponds to cluster 225, node GHI 330 corresponds to cluster 230, node MN 335 corresponds to cluster 235, and node OPQ 340 corresponds to cluster 240. Each of the nodes $V_2$={A 305, BCF 310, J 315, KL 320, DE 325, GHI 330, MN 335, OPQ 340} is assigned a weight of one. Edges $E_2$ are then constructed between various nodes $V_2$ where an edge e=(u,v) exists in $E_2$ if and only if both u and v are in $V_2$, u and v correspond to different clusters, and there is some edge in $E_1$ from one of the nodes in the cluster represented by u to some node in the cluster represented by v, or visa versa. For example, edge (BCF, DE) 350 is created as there is an edge (B, D) 165 between node B 105 and node D 109, and as node B 105 and node D 109 are in different clusters, node B 105 being in cluster 210 and node D 109 being in cluster 225. In a similar manner, edges (A, BCF) 345, (BCF, KL) 355, (BCF, J) 365, (BCF, MN) 370, (DE, MN) 375, (DE, GHI) 385, (GHI, KL) 390, J, KL) 392, (KL, MN) 394, and (MN, OPQ) 396 are created. Weights are then assigned to the edges of $E_2$ where the weight of an edge (u, v) in $E_2$ is the sum of the weights of all edges in $E_1$ that have endpoints in the two clusters u and v. For example, edge (BCF, DE) 350 is assigned a weight of 440, the sum of the edge weights of edge (B, D) 165, edge (B, E) 161, and edge (E, F) 163, all of these edges having endpoints in cluster 210 and cluster 225. In a similar manner, edge weights of 556, 700, 750, 88, 200, 360, 800, 112, 128, 470, and 500, respectively, are assigned to edges (A, BCF) 345, (BCF, KL) 355, (BCF, J) 365, (BCF, MN) 370, (DE, MN) 375, (DE, GHI) 380, (GHI, MN) 385, (GHI, KL) 390, (J, KL) 392, (KL, MN) 394, and (MN, OPQ) 396.

Let $n_2$ be the size of the next level of the memory hierarchy, typically the page size in bytes. Set $N_2=n_2/N_1$. Then the same clustering heuristic is applied to $G_2$, using the same cost function C, i.e. counting only those edges that have end points in different clusters in $G_2$, This partitioning of $G_2$ is used to construct graph $G_3=(N_3, E_3)$ by making each node in $V_3$ correspond to a cluster in $V_2$, and having an edge in $E_3$ if and only if there is some edge in $E_2$ that has end points in nodes in the two clusters represented by the endpoints of the $E_3$ edge. Again the nodes have a weight of one, and the edges have weights corresponding to the sum of the weights on the edges in $G_2$ that run between some node in cluster u and some node in cluster v.

Figure 4:
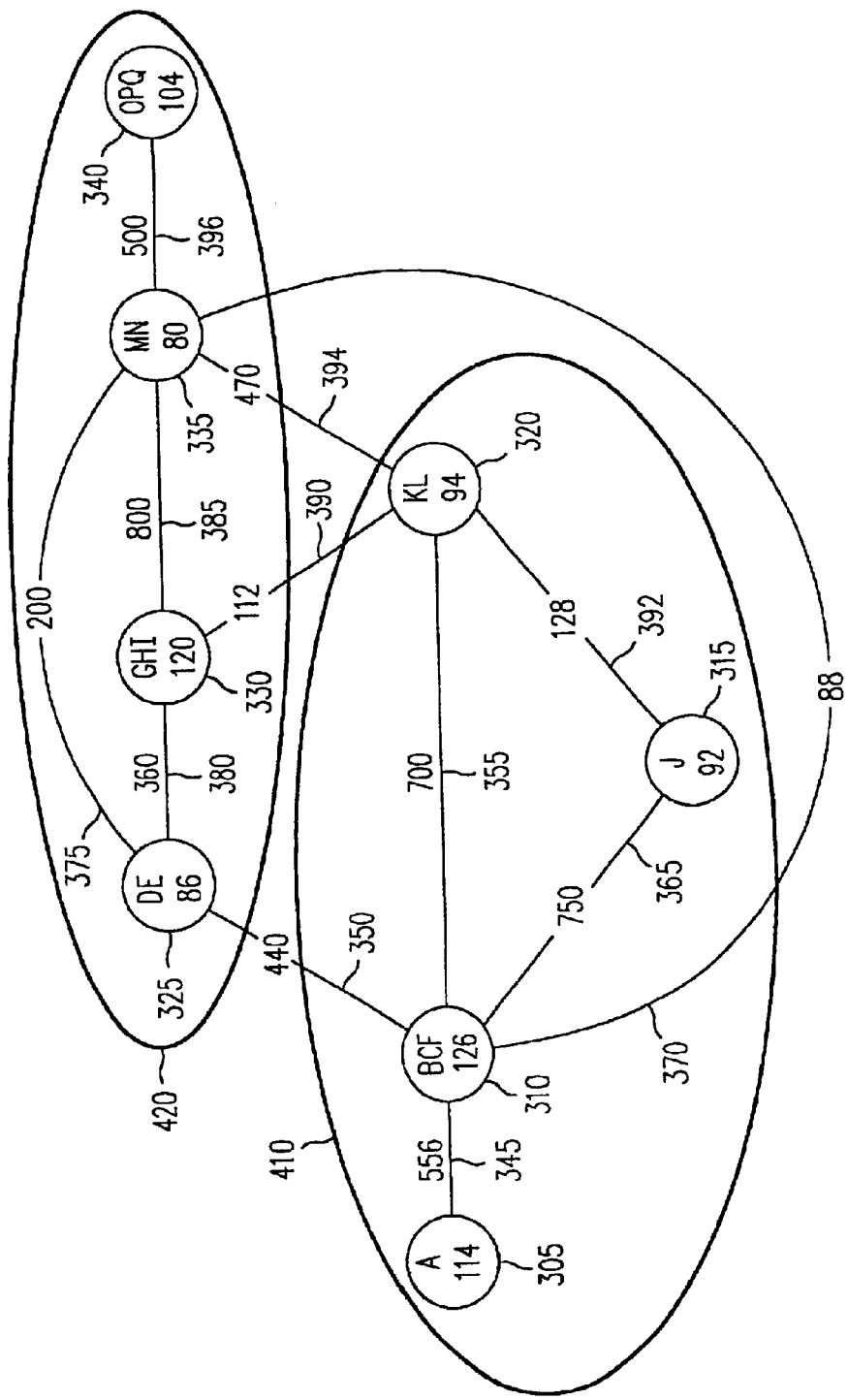
FIG. 4 shows a partitioned Program Execution Graph $G_2$ produced in accordance with the present invention.

For example, if $n_2$, the size of the next level of the memory hierarchy, is 512 bytes, then set $N_2=n_2/N_1$=512/128=4. $G_2$ may be partitioned into clusters such that the sum of the node weights of the nodes in each cluster is no greater than 4. Such a partitioning of $G_2$ yields a clustering Clust ($G_2,N_3$)={ABCFJKL 410 and DEGHIMNOPQ 420} as illustrated in FIG. 4. A graph $G_3=V_3$, $E_3$) may be constructed from the clusters Clust($G_2$, $N_2$) of $G_2$ as illustrated in FIG. 5. $G_3$ is constructed by creating a node corresponding to each cluster of Clust($G_2$, $N_3$) such that node ABCFJKL 510 corresponds to cluster 410, and node DEGHIMNOPQ 520 corresponds to cluster 420. Each of the nodes $V_3$={ABCFJKL 510, DEGHIMNOPQ 520} is assigned a weight of one. Edges $E_3$ are then constructed between various nodes $V_3$ where an edge e=(u,v) exists in $E_3$ if and only if both u and v are in $V_3$, u and v correspond to different clusters, and there is some edge in $E_2$ from one of the nodes in the cluster represented by u to some node in the cluster represented by v, or visa versa. For example, edge (ABCFJKL, DEGHIMNOPQ) 530 is created as there is an edge (BCF, DE) 350 between node BCF 310 and node DE 325 which are in different clusters, node BCF 310 being in cluster 410 and node DE 325 being in cluster 420. Weights are then assigned to the edges of E_where the weight of an edge (u, v) in $E_3$ is the sum of the weights of all edges in $E_2$ that have endpoints in the two clusters u and v. For example, edge (ABCFJKL, DEGHIMNOPQ) 530 is assigned a weight of 1110, the sum of the edge weights of edge (BCF, DE) 350, edge (KL, GHI) 390, edge (KL, MN) 470, and edge (BCF, MN) 370, all of these edges having endpoints in cluster 510 and cluster 520.

This process of graph partitioning may be repeated for each level of the memory hierarchy for i>1. For level i of the memory hierarchy, let $n_i$ be the size of the memory hierarchy, and set $N_1=n/N_{i-1}$. Then the same clustering heuristic is applied to $G_1$, using the same cost function C, i.e. counting only those edges that have end points in different clusters in $G_i$. This partitioning of $G_1$ is used to construct graph $G_{i+1}=(N_{i+1}, E_{i+1})$ by making each node in $V_{i+1}$ correspond to a cluster in $V_i$, and having an edge in $E_{i+1}$ if and only if there is some edge in $E_1$ that has end points in nodes in the two clusters represented by the endpoints of the $E_{i+1}$ edge. Again the nodes have a weight of one, and the edges have weights corresponding to the sum of the weights on the edges in $G_i$ that run between some node in cluster u and some node in cluster v.

One of the advantages of the present invention is that it may be generalized to deal with memory hierarchies with an arbitrary number of levels. In particular, the present invention may be applied to fixture improvements to memory hierarchy hardware.

Another advantage of the present invention is that it may be modified to deal with special cases. An example of such a special case occurs when a pair of basic blocks need to be close in memory. In this case, the edge connecting the two basic blocks may be given an exceedingly large weight, thereby forcing the two basic blocks into the same cluster if together they don't exceed the upper bound on the cluster size. This approach may also be generalized to the case in which several basic blocks are required to be close together in memory.

The present invention may also be modified to deal with the case of a program with a few very large basic blocks. Assume basic blocks $B_i$, $B_j$, and $B_k$ have weights larger than the size of the cache line, and that the weights of all the other basic blocks are no greater than the cache line size. Define $G'_1, =G_1-\{B_i, B_j, B_k\}$, i.e. the PEG that is obtained by removing $B_i$, $B_j$, and $B_k$ from the problem input. Let $N_1$=the cache line size, and let Clust($G'_1$, $N_1$) be the clustering that is computed by the heuristic. Clust($G'_1$, $N_1$)+$\{B_i, B_j, B_k\}$ may then be used as the input node set to the next stage of the heuristic.

As the nodes representing $B_i$, $B_j$, and $B_k$ have weights greater than the value used for $N_1$ in the first stage of the partitioning, the weight of the node in $V_2$ that corresponds to $B_i$ is $p_i$, where $p_1$ is the smallest integer such that $p_1*N_1>=$the number of bytes in $B_1$. Values $p_j$ and $p_k$ for $B_j$ and $B_k$, respectively, are similarly computed. The heuristic may then be applied to $G_2$, with the above modifications. Note that this assumes that none of $B_i$, $B_j$, and $B_k$ is larger in bytes than $n_2$,. If that is not the case, then again the very large basic block(s) may be removed from consideration and reintegrated at the next stage of the heuristic.

Figure 6A:
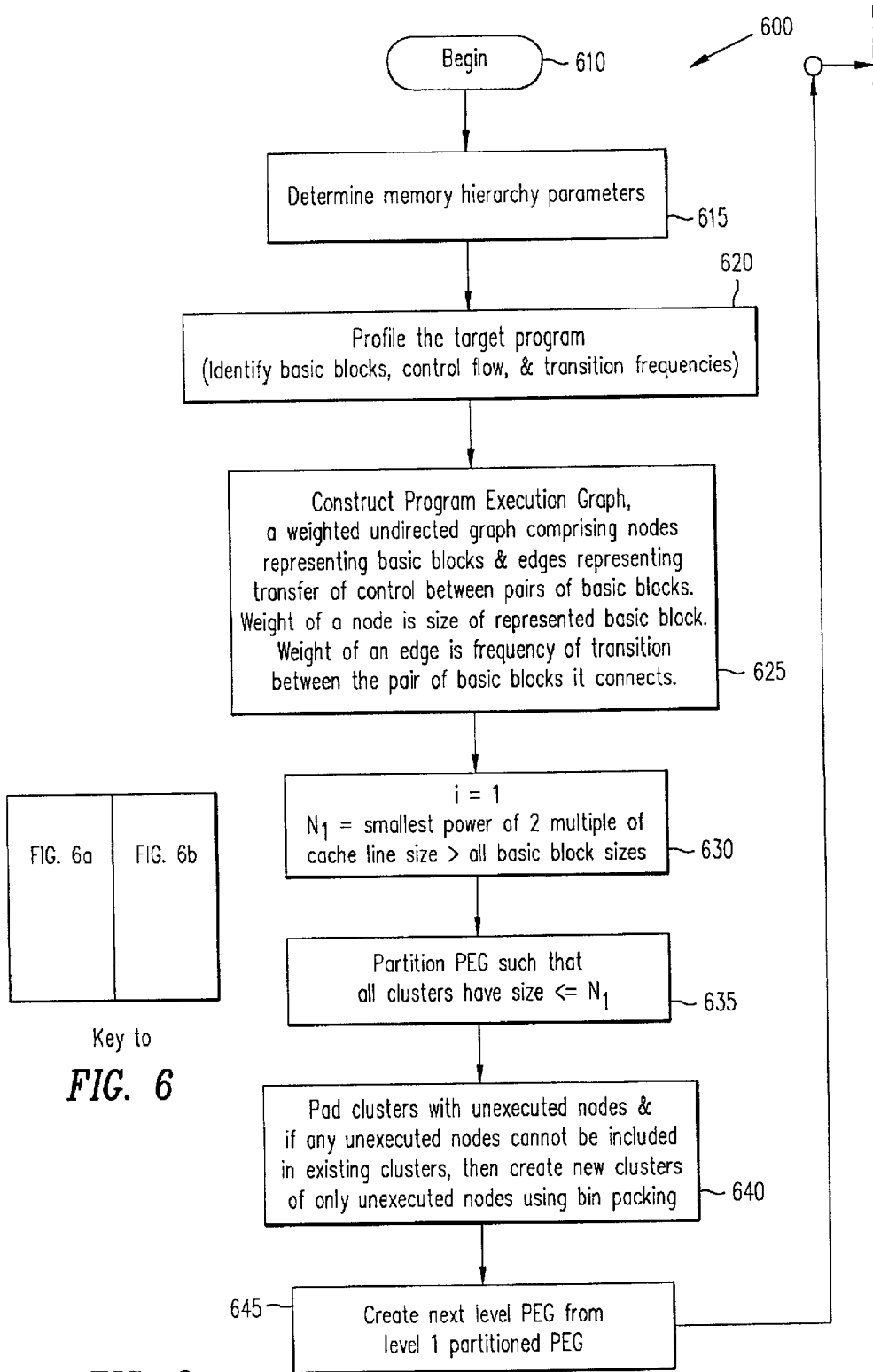
FIG. 6 and FIG. 7 are flowcharts illustrating the operations preferred in carrying out the present invention.
Figure 6B:
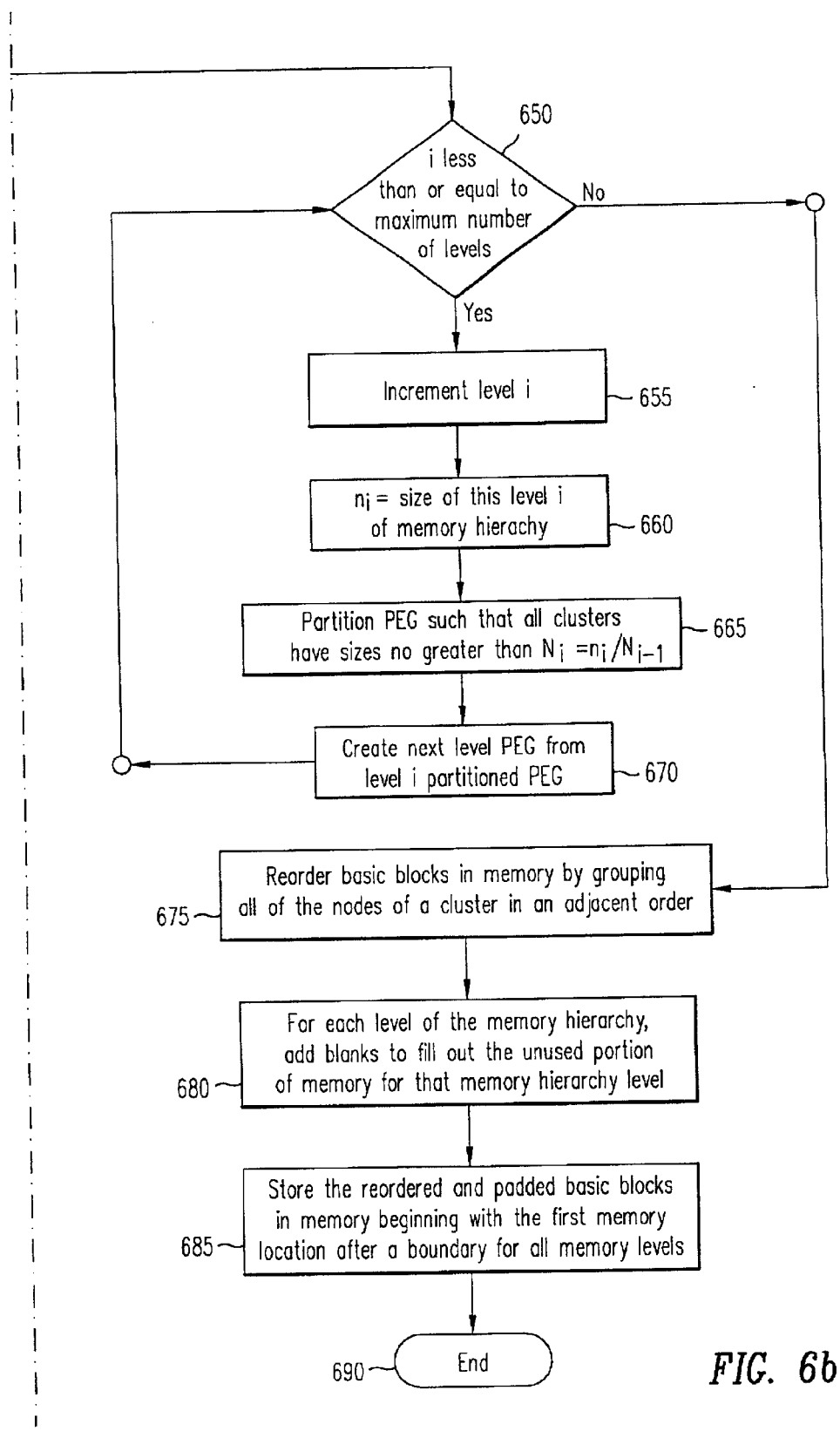
Figure 7:
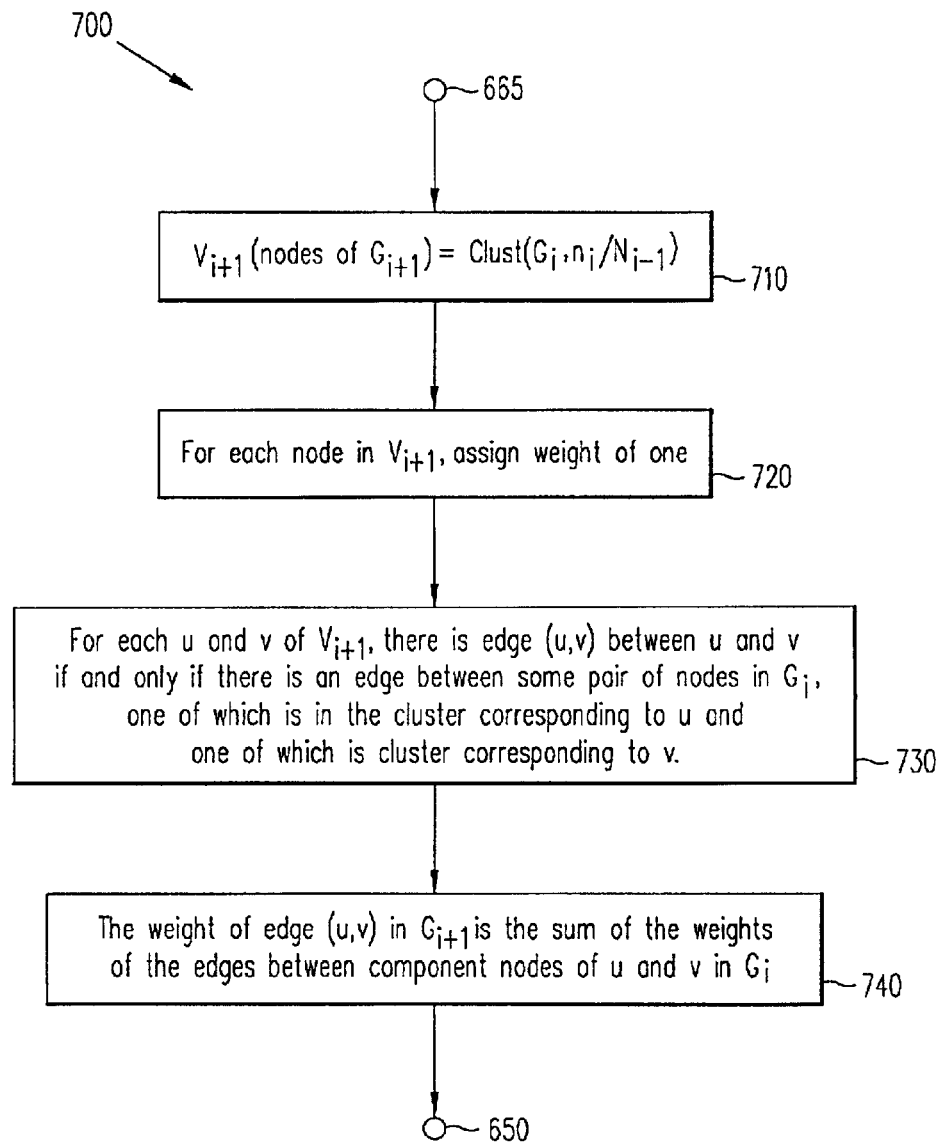

Referring next to FIG. 6 and FIG. 7, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill in the art to write code in any suitable computer programming language.

Referring now to FIG. 6, the process of the invention, generally referred to as 600, begins at process block 610. Thereafter, process block 615 determines memory hierarchy parameters such as the number of levels in the memory hierarchy and the size of each such level, and process block 620 profiles the target program. The profiler gathers information comprising identification of basic blocks, control flow between basic blocks, and frequencies of transition between basic blocks. The present invention assumes a program is divided into basic blocks, where a basic block is a contiguous sequence of instructions with a single entry into and a single exit out of this sequence. In addition, the present invention assumes information about the transfer of control between basic blocks and the frequency with which the transfer occurs during actual program execution. This information may be made available through the use of profiling techniques well known to those skilled in the art such as the teachings summarized in Simons (B. Simons, "Code Positioning for Procedures and Basic Blocks," IBM Technical Report ADTI-1994-006; also available as IBM Santa Teresa Laboratory Technical Report TR 03.580.). Responsive to the profiler provided information, process block 625, a Program Execution Graph constructor, constructs a Program Execution Graph (PEG), a weighted undirected graph comprising nodes representing basic blocks and edges representing transfer of control between pairs of basic blocks. In this PEG produced by the Program Execution Graph constructor, a weight of a node of the PEG is a size of a represented basic block, and a weight of an edge is a frequency of transition in the profiling between a pair of basic blocks that the edge connects. Process block 630 then initializes a memory hierarchy level i to one, and sets $n_1$ equal to a smallest power of 2 that is a multiple of the cache line size and that is greater than the sizes of all basic block sizes. Thereafter, process block 635 applies a heuristic H to partition $G_1$ into Clust($G_1$, $N_1$), a partitioning of the nodes in $G_1$ into dusters so that the sum of the node weights of the nodes in any cluster is no greater than $N_1$. The heuristic H solves the relaxed graph partitioning problem, and such heuristics are well known to those skilled in art such as the teachings of Barnard et al. (S. T. Barnard and H. D. Simon, "Fast Multilevel Implementation of Recursive Spectral Bisection for Partitioning Unstructured Problems," *Concurrency: Practice mid Experience*, vol.6(2), pp.101–117, April 1994.). After clustering is performed on $G_j$, process block 640 pads the clusters with unexecuted nodes by adding basic blocks that were not executed during the profiling to clusters that have capacity, i.e. where the sum of the weights of the nodes in the cluster is less than $N_1$ and where adding the un-executed basic block will not cause the sum of the cluster's weights to exceed $N_1$. This padding is performed to reduce unused memory. If there are still basic blocks remaining that have not been added to any of the clusters, and if there is no more cluster capacity to absorb these basic blocks, then process block 640 groups these unexecuted nodes into additional clusters of their own. The technique of adding the unexecuted basic block nodes to the clusters or of putting them into their own clusters is called bin packing. A greedy bin packing heuristic, which is well known to those skilled in art such as the teachings of Garey et al. (Garey, Michael and Johnson, David S. Computers and Intractability, A Guide to the Theory of NP Completeness, pages 124–127, W. H. Freeman & Co., San Francisco, Calif., 1979) may be used to perform the bin backing. Process block 645 then creates the next level PEG $G_2$ from the level 1 partitioned PEG Clust($G_1$, $N_1$). In this graph $G_2=(V_2, E_2)$ constructed by process block 645, each node in $V_2$ corresponds to a cluster in $G_j$, and each node in $V_2$ has a weight of one. This weight corresponds to the assignment of $N_1$ bytes to the basic blocks in each cluster. An edge e=(u, v) exists in $E_2$ if and only if both, and v are in $V_2$, u and v correspond to different clusters, and there is some edge in $E_1$ from one of the nodes in the cluster represented by u to some node in the cluster represented by v, or visa versa. The weight of e is the sum of the weights of all edges in $E_1$ that have endpoints in the two clusters (u and v).

Higher levels of the memory hierarchy, i greater than 1, are processed by a loop comprising decision block 650 and process blocks 655, 660, 665, and 670. Decision block 650 begins the loop for each level i of the memory hierarchy. As the loop begins, decision block 650 determines if level i is less than or equal to a maximum number of levels. If so, then process block 655 increments level i, and then process block 660 sets n, equal to the size of the memory hierarchy for level i, i.e., to the page size in bytes for the page level of the memory hierarchy. Thereafter, process block 665 applies a heuristic H to partition $G_i$ into clusters having sizes no greater than $N_i=/N_{i-1}$ to produce Clust($G_i$, $n/N_{i-1}$). Process block 665 may perform this clustering in the same manner as process block 635 or it may use a different partitioning heuristic. Thereafter, process block 670 creates the next level PEG $G_{i+1}$ from the level i partitioned PEG Clust($G_i$ $n/N_{i+1}$). In this graph $G_{i+1}=(V_{i+1}, E_{i+1})$ constructed by process block 670, each node in $V_{i+1}$ corresponds to a cluster in $G_i$, and each node in $V_{i+1}$ has a weight of one. An edge e=(u,v) exists in $E_{i+1}$ if and only if both u and v are in $V_{i+1}$, u and v correspond to different clusters, and there is some edge in $E_1$ from one of the nodes in the cluster represented by u to some node in the cluster represented by v, or visa versa. The weight of e is the sum of the weights of all edges in $E_1$ that have endpoints in the two clusters (u and v). Process block 670 performs this PEG construction in the same manner as process block 645. Thereafter, processing loops back to decision block 650, the beginning of the loop, to process the next level i+1.

Returning now to decision block 650, if level i is not less than or equal to a maximum number of levels, then process block 675 reorders basic blocks in memory by grouping all of the nodes of a cluster in an adjacent order, process block 680 adds NOPs to fill out the unused portion of memory for that memory hierarchy level for each level of the memory hierarchy; process block 685 stores the reordered and padded basic blocks in memory beginning with the first memory location after a boundary for all the memory levels; and then the process ends at process block 690.

Referring now to FIG. 7, an expansion of process block 670 is illustrated After process block 665 partitions the PEG, then process block 710, process block 720, process block 730, and process block 740 construct a Program Execution Graph $G_{i+1}$ for the next higher level i+1 wherein the nodes $N_{i+1}$ of $G_{i+1}$ are constructed from the clusters Clust($G_i$, $n/N_{i+1}$) of $G_i$. Process block 720 assigns a weight of one to each node in $N_{i+1}$. Process block 730 assigns edges $E_{i+1}$ in $G_{i+1}$ by placing an edge (u,v) between u and v, for each u and v of $N_{i+1}$, if and only if there is an edge between a pair of nodes in $G_1$, one of which is in the cluster corresponding to u and one of which is in cluster corresponding to v. Process block 740 assigns weights to the edges $E_{i+1}$ in $G_{i+1}$; the weight of an edge (u,v) in $G_{i+1}$, is the sum of the weights of the edges between component nodes in $G_1$ of the clusters, corresponding to u and v. Thereafter, processing loops back to decision block 650, the beginning of the loop, to process the next level i+1.

In an alternative embodiment of the present invention, only a single loop may be used for processing all levels of the memory hierarchy. In this alternative embodiment, process block 665 may be modified to include the functionality of process block 635 so that process block 665 partitions all PEG's. Process block 670 may also be modified to include the functionality of process block 645 so that it creates the next level PEG from all partitioned PEG's. Process block 640 may be moved within the loop to pad the first or additional level clusters.

After the clustering is completed, the basic blocks are reordered in memory by grouping all of the nodes of a cluster in an adjacent order (process block 675), although the ordering of the basic blocks within this adjacent grouping may be varied. Because clusters must not cross boundaries of memory hierarchies, NOPs are added to fill out the portion of a memory hierarchy level that is not filled by the clusters. For memory hierarchy level 1, NOPs are added to the end of any clusters that have size less than some multiple of the cache line size so that the amount of memory required for each cluster is some integral multiple of the cache line size. For each subsequent level of the memory hierarchy, the minimum number of NOPs necessary to fill out the unused portion of memory for that memory hierarchy level are added (process block 680). After the processing for the last memory hierarchy is completed yielding the final PEG, the reordered basic blocks are stored in memory starting at a boundary of all the memory levels so that all of the basic blocks from one cluster are adjacent, i.e. interleaving from different clusters is not allowed (process block 685). This is true for every level of the hierarchy.

Referring now to FIG. 3, a block diagram illustrates a computer system 800 used in performing the method of the present invention, forming part of the apparatus of the present invention, and which may use the article of manufacture comprising a computer-readable storage medium having a computer program embodied in said medium which may cause the computer system to practice the present invention. The computer system 800 includes a processor 802, which includes a central processing unit (CPU) 804, a memory 806, and a multi-level memory cache 810 (level 1 cache (L1) 812 through level n cache (Ln) 814). Additional memory, in the form of a hard disk file storage 816 and a computer-readable storage device 818, is connected to the processor 802. Computer-readable storage device 818 receives a computer-readable storage medium 820 having a computer program embodied in said medium which may cause the computer system to implement the present invention in the computer system 800. The computer system 800 includes user interface hardware, including a mouse 822 and a keyboard 824 for allowing user input to the processor 802 and a display 826 for presenting visual data to the user. The computer system may also include a printer 828.

Although the present invention has been particularly shown and described with reference to a preferred embodiment, it will be understood by those skilled in the art that various changes in form and detail may be made without departing from the spirit and the scope of the invention.

We claim:

1. A method of restructuring a program comprising a basic blocks for execution by a processor having a memory hierarchy comprised of a plurality of levels, the method comprising the steps of:

a) constructing a Program Execution Graph (PEG) corresponding to a first level of the memory hierarchy from control flow and frequency information from a profile of the program, the PEG comprising a weighted undirected graph comprising nodes and edges, each node representing a basic block, each edge representing a transfer of control between a pair of the basic blocks, each of the nodes having a weight equal to the size of the basic block represented by the node, and each of the edges having a weight equal to a frequency of transition between a pair of basic blocks represented by a pair of nodes connected by the edge, b) for the first level of the memory hierarchy, partitioning the nodes of the PEG into clusters, such that a sum of weights of the edges whose endpoints are in different clusters is minimized, and such that, for any cluster, a sum of weights of the nodes in the cluster is no greater than an upper bound corresponding to a size of the first level of the memory hierarchy; and c) restructuring the basic blocks into contiguous code corresponding to the cluster, such that the basic blocks that communicate extensively with each other are on a same level of the memory hierarchy, in order to reduce communications between the basic blocks across the levels of the memory hierarchy.

2. The method of claim 1 further comprising the steps of:

d) for a next level of the memory hierarchy, constructing a next PEG from the clusters of the partitioned PEG, such that a node in the next PEG corresponds to a cluster in the partitioned PEG, and such that there is an edge between two nodes in the next PEG if there is an edge between components of the clusters represented by the two nodes; and e) assigning a weight to each node of the next PEG;

f) assigning a weight to an edge between a pair of nodes of the next PEG representing a pair of clusters of the partitioned PEG, the edge weight being a summation of weights of edges in the partitioned PEG having endpoints in the pair of dusters in the partitioned PEG; and g) partitioning the nodes of the next PEG into clusters, such that a sum of weights of the edges whose endpoints are in different clusters is minimized, and such that, for my cluster, sum of weights of the nodes in the cluster is no greater than an upper bound corresponding to a size of a next level of the memory hierarchy.

3. The method of claim 2 further comprising the steps of:

h) making the next PEG the PEG to be partitioned for an additional level of the memory hierarchy, if any; and i) repeating steps b through f for the additional level of the memory hierarchy, if any.

4. The method of claim 1 wherein the upper bound is a multiple of a sue of a level of the memory hierarchy.

5. The method of claim 3 wherein the upper bound for a level of the memory hierarchy, other than a first level is a size of a level of the memory divided by an upper bound used to partition a next lower level of the memory hierarchy.

6. The method of clam 3 further comprising the steps of:

removing a basic block whose se is greater than the upper bound from the partitioning step; and including the removed basic block in a next repetition of steps b through f.

7. An article of manufacture for use in a computer system for restructuring a program comprising basic blocks for execution by a processor having a memory hierarchy comprised of a plurality of levels, the article of manufacture comprising a computer-readable storage medium having a computer program embodied in the medium which may cause the computer system to:

a) construct a Program Execution Graph (PEG) corresponding to a first level of the memory hierarchy from control flow and frequency information from a profile of the program, the PEG comprising a weighted undirected graph comprising nodes and edges, each node representing a basic block, each edge representing a transfer of control between a pair of the basic blocks, each of the nodes having a weight equal to the size of the basic block represented by the node, and each of the edges having a weight equal to a frequency of position between a pair of basic blocks represented by a pair of nodes connected by the edge;

b) ft the first level of the memory hierarchy, partition the nodes of the PEG into clusters, such that a sum of weighs of the edges whose endpoints are in different clusters is minimized, and such that, for any cluster, a sum of wets of the nodes in the duster is no greater than an upper bound corresponding to the first level of the memory hierarchy, and c) restructures the basic blocks into contiguous code corresponding to the clusters, such that the basic blocks that communicate extensively with each other are on a same level of the memory hierarchy, in order to reduce communications between the basic blocks across the levels of the memory hierarchy.

8. The article of manufacture of dart 7 wherein the computer program may further cause the computer system to:

d) for a next level of the memory hierarchy, construct a next PEG from the clusters of the partioned PEG, such that a node in the next PEG corresponds to a cluster in the phoned PEG, and such that there is an edge between two nodes in the next PEG if there is an edge between components of the clusters represented by the two nodes, e) assign a weight to each node of the next PEG;

f) assign a weight to an edge between a pair of nodes of the nest PEG representing a pair of clusters of the partitioned PEG, the edge weight being a summation of weights of edges in the partitioned PEG having endpoints in the pair of clusters in the partitioned PEG; and g) partitioning the nodes of the next PEG into clusters, such that a sum of weights of the edges whose endpoints are in different clusters is minimized, and such that, for any cluster, a sum of weights of the nodes in the clusters is no greater than an upper bound corresponding to a size of a next level of the memory hierarchy.

9. The article of manufacture of claim 8 wherein the computer program may further cause the computer system to:

h) make the next PEG the PEG to be partitioned for an additional level of the memory hierarchy, if any, and i) repeat steps b through for the additional level of the memory hierarchy, if any.

10. The article of manufacture of claim 7 wherein the upper bound is a multiple of a size of a level of the memory hierarchy.

11. The article of manufacture of claim 9 wherein the upper bound for a level of the memory hierarchy, other than first level, is a size of a level of the memory hierarchy level divided by an upper bound used to p on a next lower level of the memory hierarchy.

12. The article of manufacture of claim 9 wherein the computer program may further cause the computer system to:

remove a basic block whose size is greater than the upper bound from the partitioning step; and include the removed basic block in a next repetition of steps b trough f.

13. A computer system for restructuring program comprising basic blocks for execution by a processor having memory hierarchy comprised of a plurality of levels, the computer system comprising:

a) a Program Execution Graph (PEG) corresponding to a first level of the memory hierarchy constructed from control flow and frequency information from a profile of the program, the PEG comprising a weighted undirected graph comprising nodes and edges, each node representing a basic block, each edge representing a transfection of control between a pair of the basic blocks, each of the nodes having a weight equal to the size of the basic block represented by the node, and each of the edges having a weight equal to a frequency of transition between a pair of basic blocks represented by a pair of nodes connected by the edge;

b) a partition of the nodes of the PEG into clusters for the first level of the memory hierarchy, such that a sum of weights of the edges whose endpoints are in different clusters is minimized, and such that, for any cluster, a sum of weights of the nodes in the cluster is no greater than an upper bound corresponding to a size of the first level of the memory hierarchy; and c) a restructuring of the basic blocks into contiguous code corresponding to the clusters, such that the basic blocks that communicate extensively with each other are on a same level of the memory hierarchy, in order to reduce communications between the basic blocks across the levels of the memory hierarchy.

14. The computer system of claim 13 further comprising:

d) a next PEG constructed from the clusters of the partitioned PEG for a next level of the memory hierarchy, such that a node in the next PEG corresponds to a cluster in the partioned PEG, and such that there is an edge between two nodes in the next PEG if there is an edge between components of the clusters represented by the two nodes;

e) a weight assigned to each node of the next PEG;

f) a weight assigned to in edge between a pair of nodes of the next PEG representing a pair of cluster of the partioned PEG, the edge weight being a summation of weights of edges in the partioned PEG having endpoints in the pair of clusters in the partitioned PEG; and g) a partitioning of the nodes of the next PEG into clusters such that a sum of weights of the edges whose endpoints are in different clusters is minimized, and such that, for any cluster, a sum of weights of the nodes in the cluster is no greater than an upper bound corresponding to a size of a next level of the memory hierarchy.

15. The computer sys of claim 14 further comprising:

h) a conversion of the next PEG into the PEG to be partitioned for an additional level of the memory hierarchy, if any; and i) a repetition of elements b through f for the additional level of the memory hierarchy, if any.

16. The computer system of claim 13 wherein the upper bound is a multiple of a size of a level of the memory hierarchy.

17. The computer system of claim 15 wherein the upper bound for a level of the memory hierarchy, other than a first level, is a size of a level of the memory hierarchy level divided by an upper bound used to partition a next lower level of the memory hierarchy.

18. The computer system of claim 15 further comprising:

a removal of a basic block whose size is greater than the upper bound from the partitioned step; and an inclusion of the removed basic block in a next repetition of element b through f.

* * * * *

UNITED STATES PATENT AND TRADEMARK OFFICE
CERTIFICATE OF CORRECTION

PATENT NO. : 6,839,895 B1
DATED : January 4, 2005
INVENTOR(S) : Dz Ching Ju et al.

It is certified that error appears in the above-identified patent and that said Letters Patent is hereby corrected as shown below:

Title page,
Item [56], References Cited, OTHER PUBLICATIONS,
"Pettis K" reference, "16-127" should read -- 16-27 --.
Item [57], ABSTRACT,
Line 14, "blocs" should read -- blocks --.

Column 12,
Line 48, delete third occurrence of "a"

Column 13,
Line 5, "cluster" should read -- clusters --.
Line 23, "dusters" should read -- clusters --.
Line 27, "my" should read -- any --, after "cluster" insert -- a --.
Line 36, "sue" should read --size --.
Line 43, "se" should read -- size --.
Line 66, "ft" should read -- for --.

Column 14,
Line 3, "wets" should read -- weights --, "duster" should read -- cluster --.
Line 6, "restructures" should read -- restructure --.

Signed and Sealed this

Twelfth Day of April, 2005

JON W. DUDAS
*Director of the United States Patent and Trademark Office*